United States Patent
Ambrosini

(10) Patent No.: US 8,474,741 B2
(45) Date of Patent: Jul. 2, 2013

(54) EXTRACTION DEVICE FOR COFFEE GROUNDS OR SIMILAR

(76) Inventor: Marco Ambrosini, Buttapietra Verona (IT)

( * ) Notice: Subject to any disclaimer, the term of this patent is extended or adjusted under 35 U.S.C. 154(b) by 429 days.

(21) Appl. No.: 12/937,711

(22) PCT Filed: Mar. 20, 2009

(86) PCT No.: PCT/IB2009/051176
§ 371 (c)(1),
(2), (4) Date: Oct. 13, 2010

(87) PCT Pub. No.: WO2009/127983
PCT Pub. Date: Oct. 22, 2009

(65) Prior Publication Data
US 2011/0030562 A1    Feb. 10, 2011

(30) Foreign Application Priority Data
Apr. 18, 2008 (IT) .............................. VR2008A0046

(51) Int. Cl.
*B02C 18/12* (2006.01)

(52) U.S. Cl.
USPC ........................................ 241/282.2; 241/100

(58) Field of Classification Search
USPC ..................... 241/100, 282.1, 282.2
See application file for complete search history.

(56) References Cited

FOREIGN PATENT DOCUMENTS

| EP | 0566517 A1 | 4/1993 |
|---|---|---|
| EP | 1803380 A2 | 4/2007 |
| FR | 2840521 | * 12/2003 |

* cited by examiner

*Primary Examiner* — Mark Rosenbaum
(74) *Attorney, Agent, or Firm* — Greenberg Traurig, LLP

(57) ABSTRACT

An extractor device for coffee grounds that substantially consists of a tubular frame (10), inside which is a casing (11) fixed to the frame (10) and comprising a gear motor (12) preferably the low-voltage type, the lower part of the tubular frame (10) being open to allow the possibility of attaching a container bag (13) to collect the coffee grounds from above, the motor (12), positioned inside the casing (11) whose upper part terminates with a conical shape (11'), comprising a shaft (14) attached to the extraction device (15) which substantially consists of a blade (16) with two or more sectors.

19 Claims, 5 Drawing Sheets

EXTRACTION DEVICE FOR COFFEE GROUNDS OR SIMILAR

BACKGROUND

1. Field

This invention concerns an extraction device particularly suitable for removing coffee grounds from the filter of espresso type coffee machines or similar.

More specifically, this invention concerns a device which allows completely automatic extraction of coffee grounds from the filters of coffee machines, in particular those designed for public places such as bars or catering locations in general.

The device according to the invention substantially consists of a motor inside a frame, the upper part of the motor being equipped with a blade for breaking up the grounds, activated when the filter containing the grounds to be extracted is positioned above it.

This invention can be applied in the sector of accessories for public and private catering, in particular accessories for espresso type cafeteria services or cafeteria services in general.

2. General Background

It is a known fact that in the catering sector one problem felt in particular by operatives is the preparation of coffee by means of espresso type coffee machines.

In fact, in order to make the coffee, the operative prepares the dose of coffee to be inserted in the filter, compresses the dose in the filter and then inserts the filter-holder in the machine so that the coffee will be delivered into the cup.

At the end of this operation, the operative removes the filter-holder from the machine and then carries out a series of downward-striking movements so that the coffee grounds fall into a collection drawer fitted with a striker element.

This operation is particularly annoying and extremely impractical, especially if one considers the number of coffees that the operatives have to prepare every day. From this point of view, it would be desirable to provide operatives with a device that automates all these procedures for extraction of coffee grounds from the filter in which they are contained.

Another problem that occurs in the areas close to coffee machines is the presence of annoying insects, difficult to find and eliminate, which derive from the presence of coffee grounds in the collection drawer, these grounds not being properly enclosed in a bag disposed of on a daily basis.

Additionally, the use of known collection drawers creates an obstacle when the drawer is in the open position and the spillage of part of the grounds during the extraction operations, creating dirt which is detrimental for the correct hygiene in the location.

SUMMARY

This invention proposes to provide a device for the extraction of coffee grounds, which can eliminate or at least reduce the problems described above.

The invention also proposes to provide a device for the extraction of coffee grounds that is simple to produce and can thus be rapidly adopted in all public catering locations, such as bars, restaurants and the like, or also in domestic environments.

This is achieved by means of an extraction device for coffee grounds, the features of which are described in the main claim.

The dependent claims of the solution in question describe advantageous embodiments of the invention.

The main advantages of this solution, in addition to those deriving from the construction simplicity, concern first of all the fact that this device can be installed in any location, whether already fitted out or not, and installed in combination with or fitted on a coffee machine or grinder-doser of any kind present in the catering location such as a bar or the like.

One of the advantages achieved by the invention concerns the considerable saving of time in the extraction operations, since the operation is carried out almost automatically, with all the consequent advantages.

The device according to the invention substantially consists, therefore, of an extractor comprising a motor positioned inside a frame, the upper part of this motor being equipped with a blade for breaking up the grounds, activated when the filter containing the grounds to be extracted is positioned above it.

This extractor can be positioned below the work surface close to the espresso coffee machine.

The extractor device is equipped with an appropriately shaped blade which is also designed to extract coffee grounds from different sizes of filters inserted in the respective filter-holder, whether single or double-dose.

DRAWINGS

The above-mentioned features and objects of the present disclosure will become more apparent with reference to the following description taken in conjunction with the accompanying drawings wherein like reference numerals denote like elements and in which:

Other features and advantages of the invention will become clear on reading the description given below of one embodiment of the invention, provided as a non-binding example, with the help of the accompanying drawings, in which.

DETAILED DESCRIPTION

Figure 1:
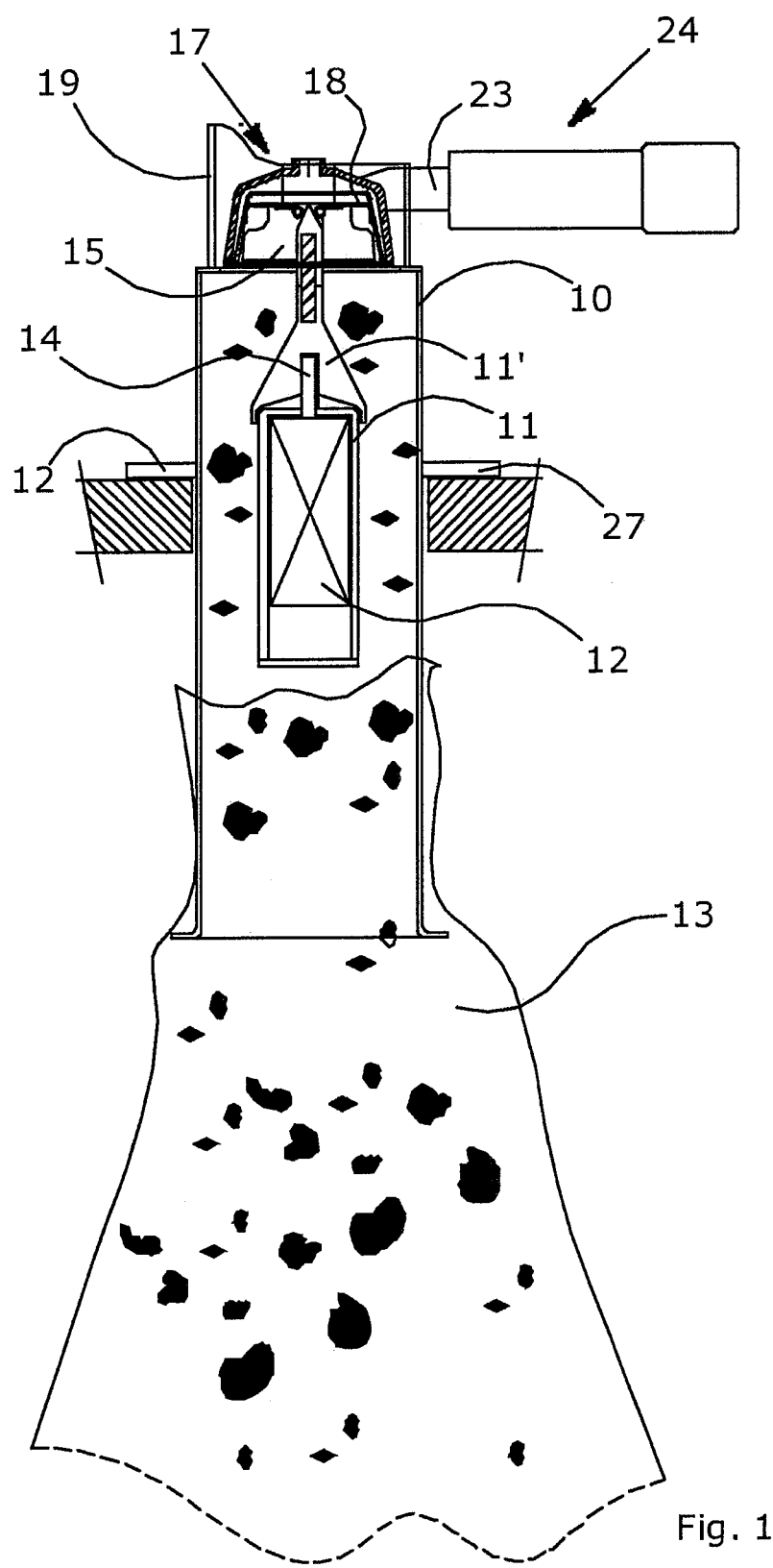
FIG. 1 represents a schematic partial vertical cross-section view of the extractor device according to the invention.

With reference to the accompanying drawings, the extractor device for coffee grounds according to the invention substantially consists of a tubular frame 10, containing the casing 11 of a low-voltage motor 12.

The lower part of the tubular frame 10 is open and a container bag 13 can be attached to it to collect the coffee grounds from above.

The motor 12 positioned inside the casing 11, the upper part of which terminates with a conical shape 11', extends upwards with a shaft 14 equipped with the extraction device 15, substantially comprising a blade 16 with two or more sectors, preferably three sectors.

The blade 16 is shaped to fit inside the filter 17, in such a way as to extract the coffee grounds contained in the filter, whether it is the single or double-dose version.

Figure 2:
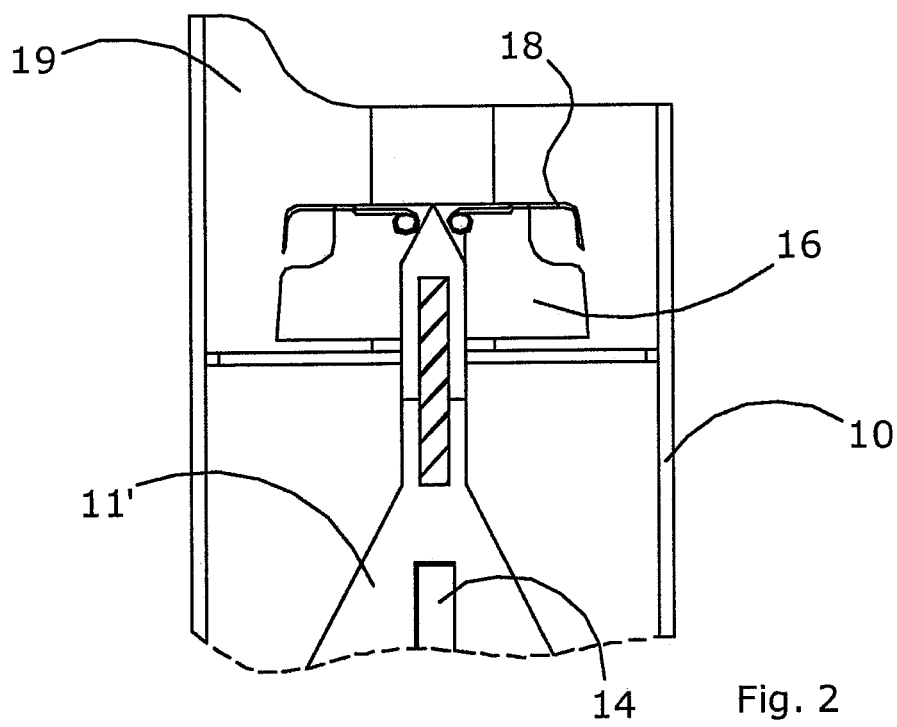
FIG. 2 represents a schematic view of a detail of the upper part of the motor shaft of the extractor device according to the invention.
Figure 3:
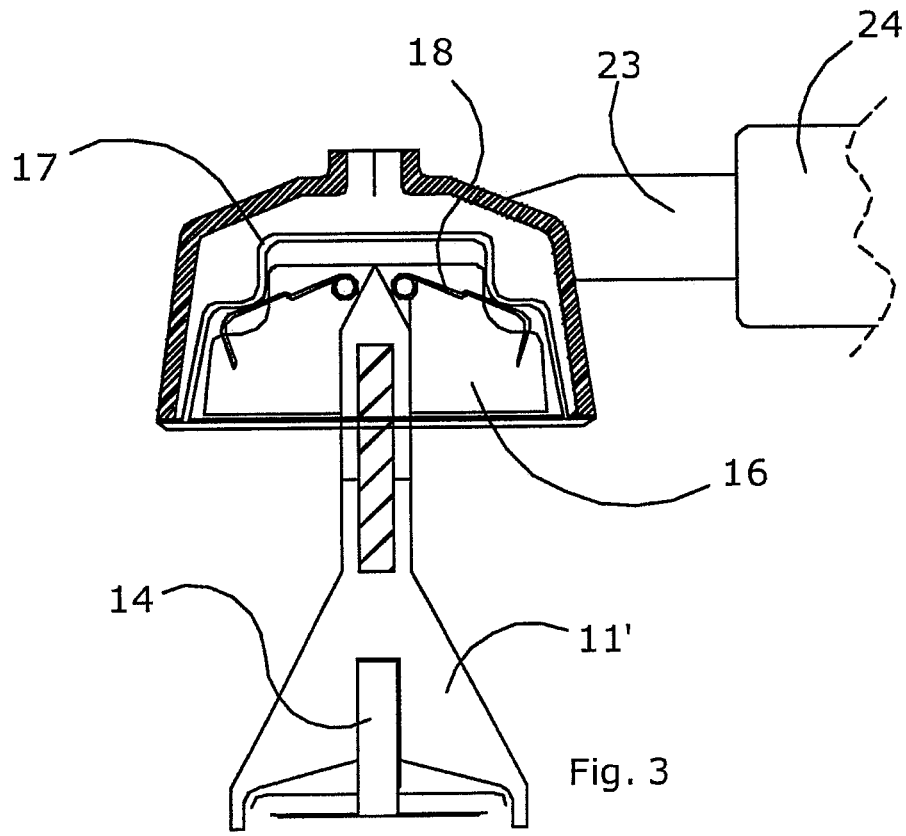
FIG. 3 represents a schematic view of the extractor device according to the invention in which a single coffee dose filter is used.
Figure 4:
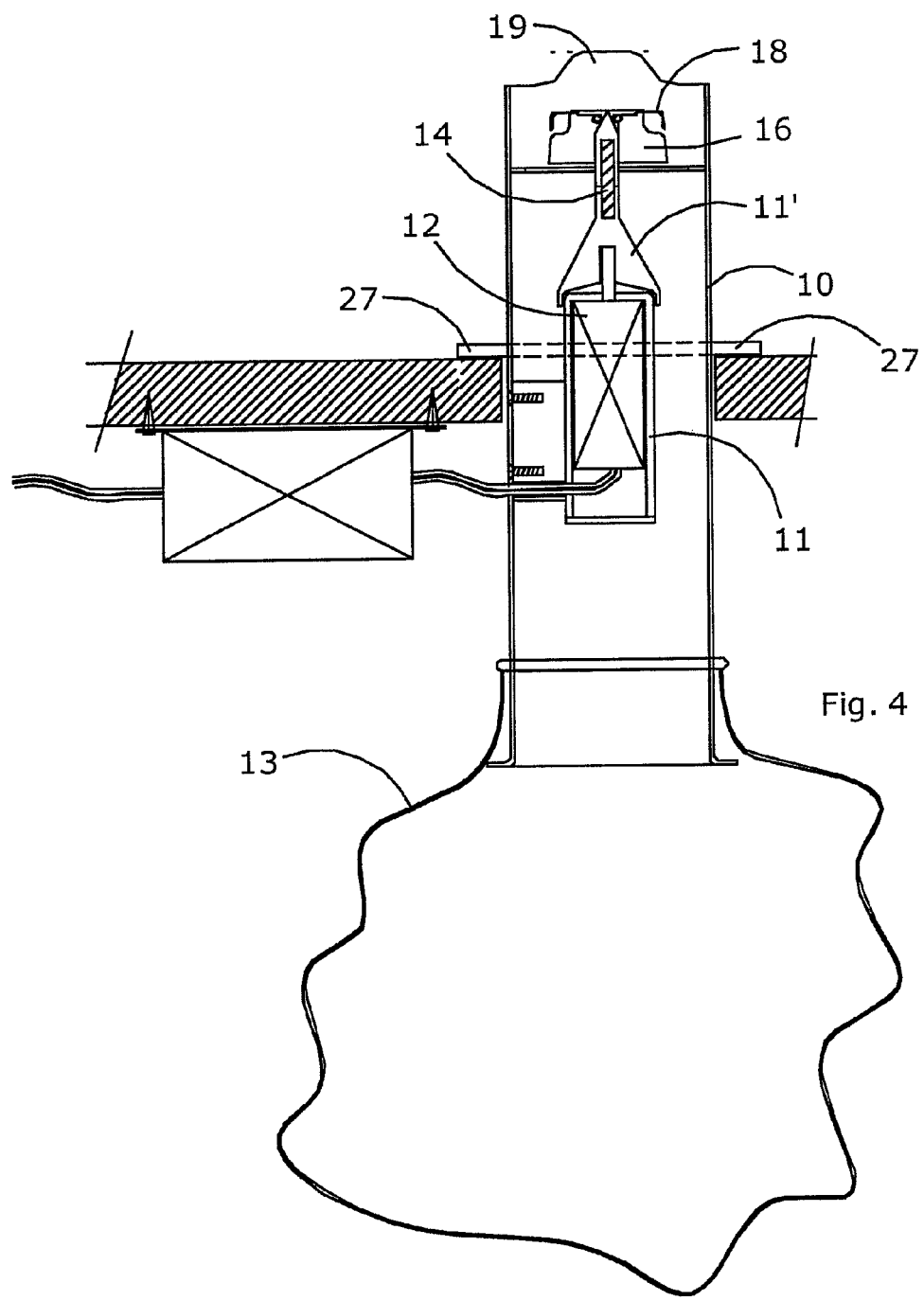
FIG. 4 shows a schematic partial vertical cross-section view of the extractor device according to the invention fitted to a work surface close to a coffee machine.

As can be seen in FIGS. 2 and 3, the extractor device is fitted with an elastic metal accessory 18, designed to penetrate further into the single-dose version of the filter 17.

FIG. 1 shows the double-dose version of the elastic accessory 18.

Above the tubular frame 10, as can be clearly seen in FIG. 2, is a substantially circular protective guard 19 which makes it possible to contain the coffee grounds and prevent spillage. This protective guard 19 also acts as a guide for the positioning of the filter-holder.

To activate the device, pressure or electrical-contact activators are foreseen, which act when the filter-holder comes into contact with the blade, or makes contact with low-voltage connectors positioned, for example, along the inner edge of the protective guard 19.

Figure 5:
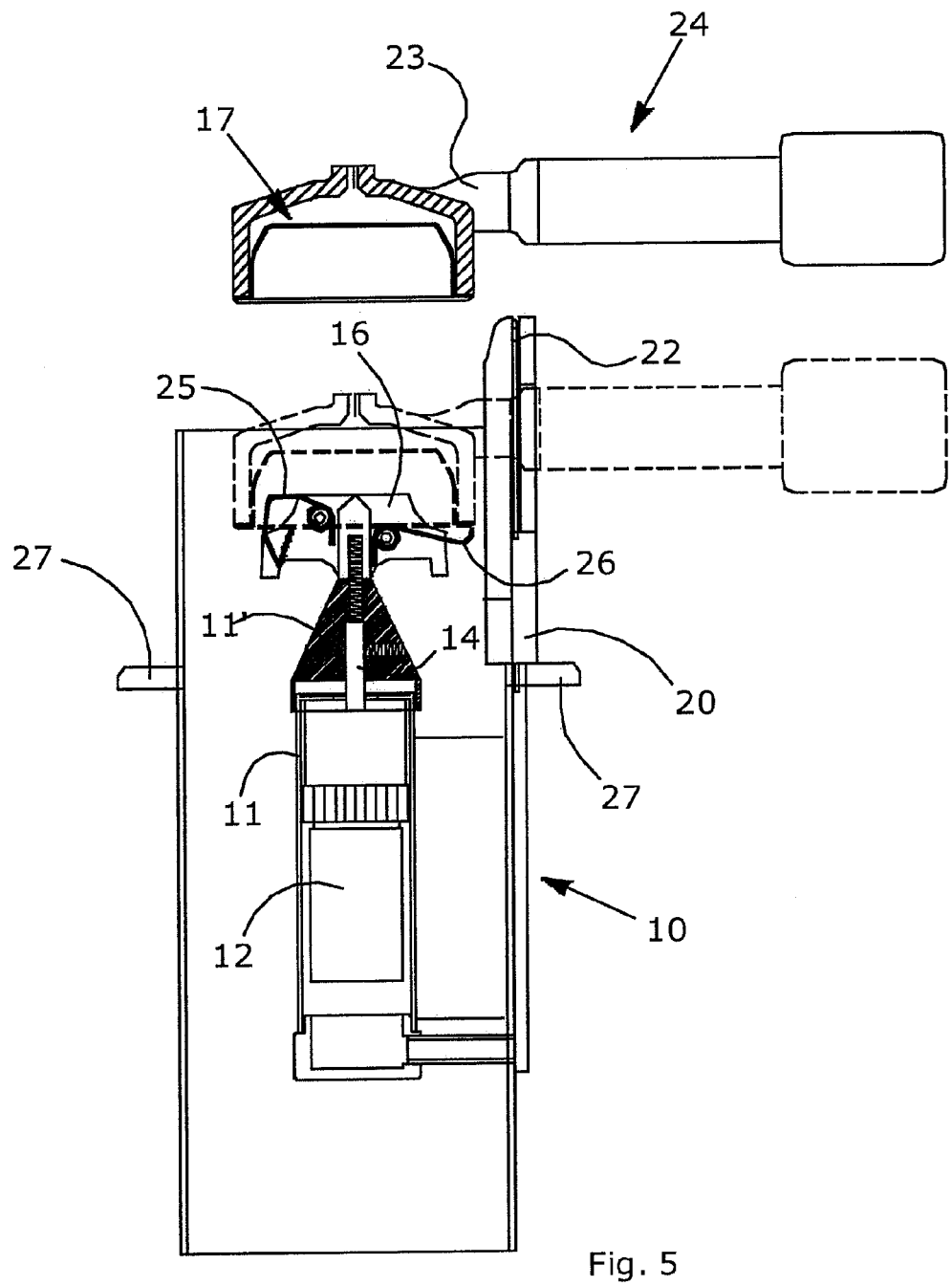
FIG. 5 represents a schematic view of an extractor device according to another embodiment of the invention.
Figure 6:
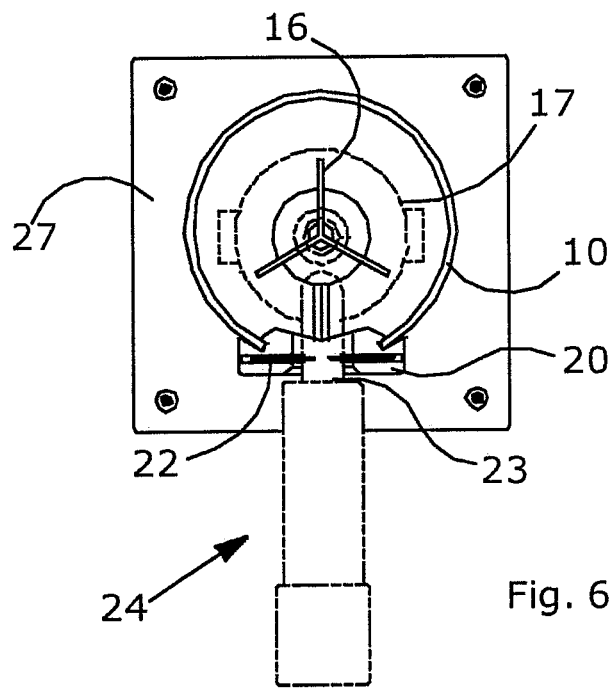
FIG. 6 is a schematic plan view of the extractor on which a filter-holder, shown in broken lines, is positioned.
Figure 7:
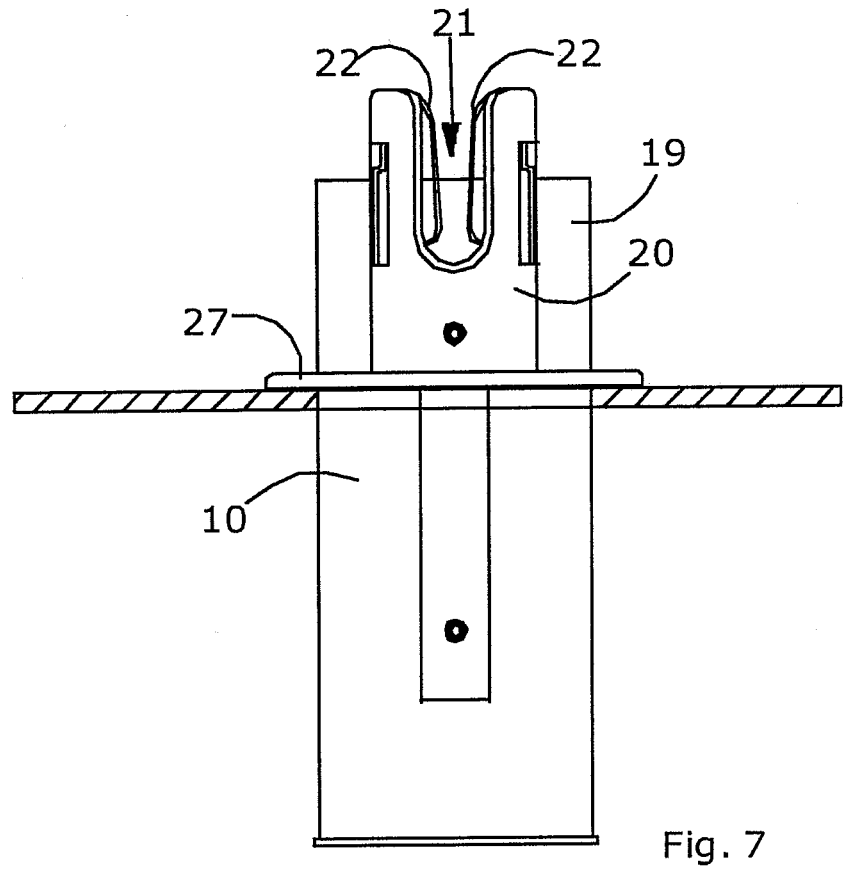
FIG. 7 shows a view of the extractor according to another embodiment.

FIGS. 5 to 7 show an embodiment of the invention which foresees the use of a bracket 20, fitted on an open side of the upper protective guard 19, the bracket equipped with a recess 21 on the sides of which are two metal and flexible electrical contacts 22 or activators.

These two flexible activator contacts 22 are electrically connected to means for driving the motor 12, so that when the metal neck 23 of the filter-holder 24 is inserted in the recess 21, the contacts are electrically connected, activating the motor 12 and the consequent rotation of the revolving blade 16.

The blade 16 or extractor is made from metal wire, brushes or helical elements which dig into the grounds to allow their extraction, or it consists of spring-activated telescopic blades. In FIG. 5 it can be seen that the blade 16 consists of shaped elastic springs 25 and 26. The shape of these springs is defined by the shape of the filter 17 and of its edge, which must be kept clean to improve the contact with the seal of the coffee machine.

Finally, the body of the device according to the invention is externally equipped with a collar 27 which allows the device to be positioned inside a hole cut in the work surface or in a shelf which can be fitted in various ways on the work surface.

The invention is described above with reference to a preferred embodiment. It is nevertheless clear that the invention is susceptible to numerous variations which lie with the scope of its disclosure, in the framework of technical equivalents.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. An extractor device for coffee grounds comprising a tubular frame, inside which is a casing fixed to the frame and comprising a gear motor, the lower part of the tubular frame being open to allow for attaching a container bag to collect the coffee grounds from above and the motor being positioned inside the casing whose upper part terminates with a conical shape, and a shaft attached to the extraction device which includes a blade with at least two sectors.

2. An extractor device for coffee grounds according to claim 1, including an elastic metal accessory, the accessory being for penetrating further into a double-dose version of the filter.

3. An extractor device for coffee grounds according to claim 1, wherein the tubular frame is a substantially circular protective guard for containing the coffee grounds and preventing spillage, and the protective guard is a guide for the positioning of the neck of the filter-holder.

4. An extractor device for coffee grounds according to claim 1, including activating the device by a pressure or electrical-contact, photocell or other activator, the activation being when the filter-holder contacts the blade, or contacts with low-voltage connectors in the device.

5. An extractor device for coffee grounds according to claim 1, including activating the device by electrical contact activators of a metal spring positioned inside a fork forming part of a bracket to accommodate a filter-holder, the fork being for accommodating the neck of the filter-holder and creating an electrical bridge between the springs causing closure of the contact which activates the motor which turns the blade.

6. An extractor device for coffee grounds according to claim 1, wherein the blade is made from metal wire, including at least one of spring-activated telescopic blades, brushes, or helical elements for digging into grounds to allow their extraction.

7. An extractor device for coffee grounds according to claim 1, wherein the shape and composition of the blade is defined by the shape of the filter and its edge, the edge in a clean state improving the contact with a seal of the coffee machine.

8. An extractor device for coffee grounds according to claim 1, wherein the blade is shaped to fit inside the filter, thereby permitting the extraction of the coffee grounds contained in the single or double-dose filter.

9. An extractor device for coffee grounds according to claim 8, including an elastic metal accessory, the accessory being for penetrating further into the double-dose version of the filter.

10. An extractor device for coffee grounds according to claim 8, wherein the tubular frame is a substantially circular protective guard for containing the coffee grounds and preventing spillage, and the protective guard is a guide for the positioning of the neck of the filter-holder.

11. An extractor device for coffee grounds according to claim 8, including activating the device by a pressure or electrical-contact, photocell or other activators, the activation being when the filter-holder contacts the blade, or contacts with low-voltage connectors in the device.

12. An extractor device for coffee grounds according to claim 8, including activating the device by electrical contact activators of a metal spring positioned inside a fork forming part of a bracket to accommodate a filter-holder, the fork being for accommodating the neck of the filter-holder, and creating an electrical bridge between the springs causing closure of the contact which activates the motor which turns the blade.

13. An extractor device for coffee grounds according to claim 8, wherein the blade is made from metal wire, including at least one of spring-activated telescopic blades, brushes, or helical elements for digging into grounds to allow their extraction.

14. An extractor device for coffee grounds according to claim 8, wherein the shape and composition of the blade is defined by the shape of the filter and its edge, the edge in a clean state improving the contact with a seal of the coffee machine.

15. An extractor device for coffee grounds comprising a tubular frame, inside which is a casing fixed to the frame and comprising a gear motor, the lower part of the tubular frame being open to allow for attaching a container bag to collect the coffee grounds from above and the motor being positioned inside the casing whose upper part terminates with a conical shape, and an elastic metal accessory for penetrating into the filter shaft attached to the extraction device which includes a blade with at least two sectors.

16. An extractor device for coffee grounds according to claim 15, wherein the tubular frame is a substantially circular protective guard for containing the coffee grounds and preventing spillage, and the protective guard is a guide for the positioning of the neck of the filter-holder.

17. An extractor device for coffee grounds according to claim 16, including activating the device by a pressure or electrical-contact, photocell or other activator, the activation being when the filter-holder contacts the blade, or contacts with low-voltage connectors in the device.

18. An extractor device for coffee grounds according to claim 16, including activating the device by electrical contact activators of a metal spring positioned inside a fork forming part of a bracket to accommodate a filter-holder, the fork being for accommodating the neck of the filter-holder, and creating an electrical bridge between the springs causing closure of the contact which activates the motor which turns the blade.

19. An extractor device for coffee grounds according to claim 16, wherein the blade is made from metal wire, including at least one of spring-activated telescopic blades, brushes, or helical elements for digging into grounds to allow their extraction, the shape of the blade being defined by the shape of the filter and its edge.

* * * * *